(12) United States Patent
Jacobs

(10) Patent No.: US 6,481,384 B2
(45) Date of Patent: Nov. 19, 2002

(54) MULTI-RING ANIMAL TRAINING COLLAR

(76) Inventor: Robert David Jacobs, 1625 Carey Rd., Franklin, NY (US) 13775

( * ) Notice: Subject to any disclaimer, the term of this patent is extended or adjusted under 35 U.S.C. 154(b) by 0 days.

(21) Appl. No.: 09/788,843

(22) Filed: Feb. 20, 2001

(65) Prior Publication Data

US 2002/0112676 A1 Aug. 22, 2002

(51) Int. Cl.$^7$ ................................................ A01K 27/00
(52) U.S. Cl. ....................................................... 119/864
(58) Field of Search ................................. 119/864, 863, 119/850, 856

(56) References Cited

U.S. PATENT DOCUMENTS

| | | | | |
|---|---|---|---|---|
| 2,614,533 A | * | 10/1952 | Elsinger ..................... | 119/864 |
| 3,995,598 A | * | 12/1976 | Gardner et al. ............. | 119/864 |
| 4,811,695 A | * | 3/1989 | Higgins ...................... | 119/863 |
| 4,924,815 A | * | 5/1990 | Halla .......................... | 119/864 |
| 4,996,948 A | * | 3/1991 | Klein et al. ................. | 119/864 |
| 5,647,303 A | * | 7/1997 | Deioma ...................... | 119/864 |
| 6,308,663 B1 | * | 10/2001 | Philen et al. ................ | 119/863 |

FOREIGN PATENT DOCUMENTS

JP       2000157090 A  *  6/2000

* cited by examiner

Primary Examiner—Charles T. Jordan
Assistant Examiner—John W. Zerr
(74) Attorney, Agent, or Firm—Salzman & Levy

(57) ABSTRACT

There is provided a multi-ring animal training collar that can be used to restrain the animal or to choke the animal. The unit features a plurality of rings spaced around the periphery of the collar thus facilitating attachment of a leash or other restrain at or near the top of the animal's head. This eliminates the need to access the lower area of the animal's neck thereby improving both convenience and safety when attaching the leash to the training collar. The collar may be formed from steel chain or the like or from straps of material such as leather or nylon. Multiple rings allow for two modes of operation: restraint or restraint and choking. These modes are selected by selecting different attachment rings according to the function desired.

8 Claims, 4 Drawing Sheets

MULTI-RING ANIMAL TRAINING COLLAR

FIELD OF THE INVENTION

The field of the present invention is animal training collars, especially those designed to squeeze down on the animal's neck when pulling pressure is applied.

BACKGROUND OF THE INVENTION

Conventional animal training collars involve a single ring by which to hold or to attach a leash. Typically a conventional collar chain has a ring on each end and when placed around the animal's neck one of the rings can be pulled to tighten the collar around the animal's neck. The trainer or user is required to reach under the animal's neck to find the ring to attach a leash or other device to. This task can be dangerous and time consuming in situations where time is of the essence. The trainer or user must search around the animal's neck to find the single ring that is usually at the bottom of the animal's neck due to the weight of the ring and gravity pulling it to the lowest point.

Conventional training collars are extremely difficult for an older or handicapped person to grab to restrain the animal or attach a leash. The person must reach under the animal to find a single ring to grab. This can be a difficult and uncomfortable task Conventional methods are dangerous for someone who is not extremely familiar with the animal in question in that animals do not like unfamiliar people reaching under their necks. This can cause extreme difficulties for animal trainers, animal keepers (i.e. dog kennels, zoos), animal sitters, etc.

A need was perceived for a safer, more comfortable, easier to grab and leash, training collar for all animals.

SUMMARY OF THE INVENTION

The present invention is directed to a training collar that has multiple rings any one of which can be quickly and easily grabbed and leashed to contain the animal. One of the hallmarks of the invention is there will always be an attachable ring at the top of the animal's neck and there will no longer be a need to search below the animals neck for an attachable ring.

The collars can be made from a plurality of materials including the most common, steel linked chain.

Any individual can easily grab one of the training rings to restrain the animal without having to reach under the animal taking important time searching for a restraining ring. The danger of alarming the animal by reaching under the neck is no longer present.

It is the object of the present invention to provide a safe, effective, easily used training collar for any animal requiring such a device. Other advantages will appear hereinafter.

DETAILED DESCRIPTION OF THE PREFERRED EMBODIMENT

Figure 1:
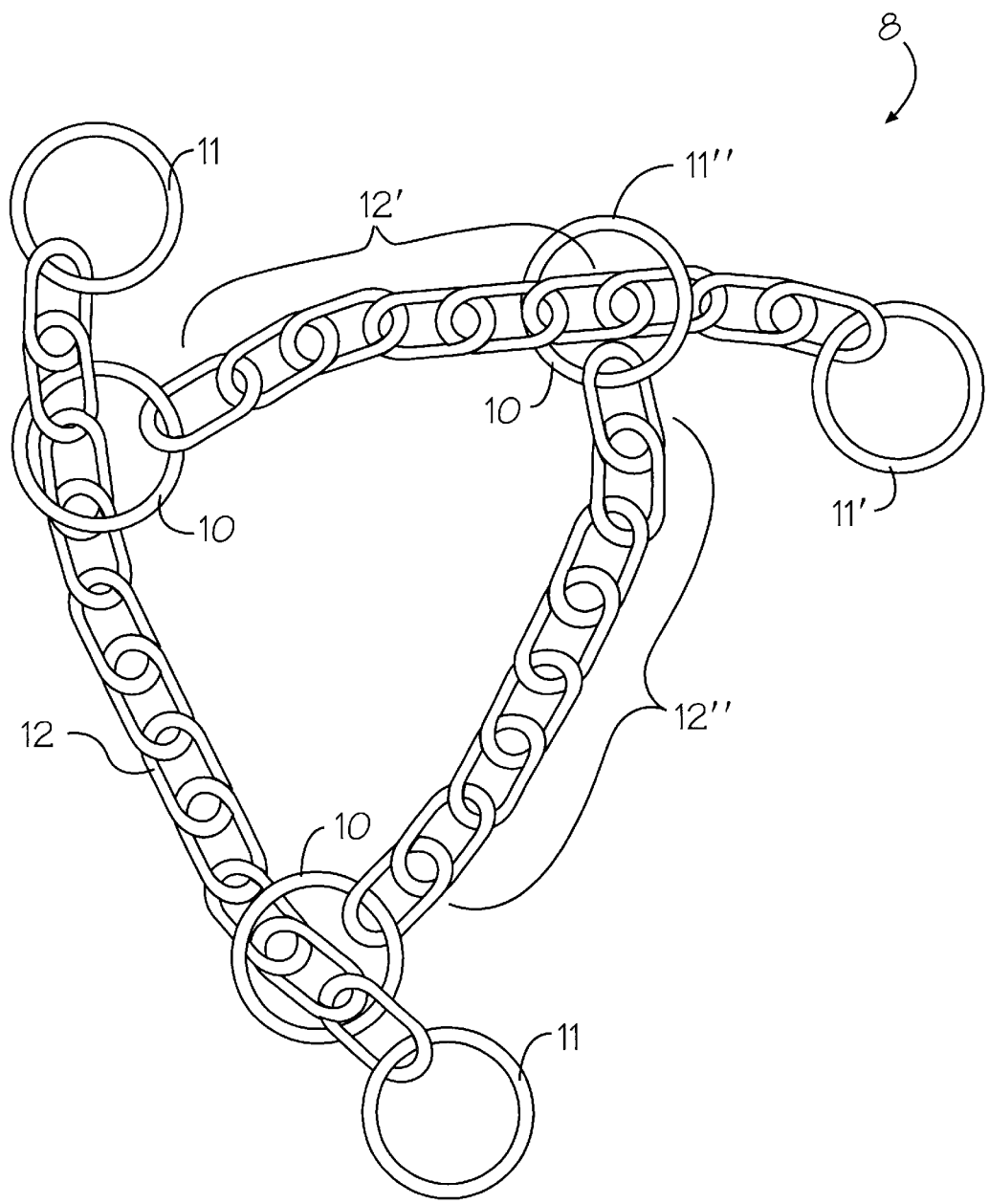
FIG. 1 is a perspective view of a multi-ring training collar made from steel chain showing three rings that can be used to restrain the animal.

Referring first to FIG. 1, there is shown a perspective view of a first embodiment of the inventive animal training collar, generally at reference number 8. A pair of substantially circular rings 11 are joined to one another by a first interconnecting link 12, each end of which is slidably affixed to a ring 11. Rings 10, 11, 11', 11" are each adapted for selectively attaching a leash or other similar restraint (not shown) to training collar 8. Attaching a leash (not shown) to rings 10 or 11" provides animal restraint but substantially no choking action. However, attaching the leash (not shown) to rings 11 or 11' provides chocking action in addition to animal restraint. A second interconnecting link 12' has substantially circular rings 10, 11' slidably affixed at proximal and distal ends thereof, respectively. A third interconnecting link 12" has substantially circular rings 10, 11" slidably affixed at proximal and distal ends thereof, respectively. Circular rings 10 at the proximal ends of second and third interconnecting links 12', 12" surround first interconnecting link 12, and are retained thereupon by rings 11. The substantially circular ring 11" disposed at the distal end of third interconnecting link 12" is disposed around second interconnecting link 12' and is retained thereupon by the substantially circular ring 10 and ring 11' at the proximal and distal ends thereof, respectively. This arrangement forms an open collar 8 wherein rings 10 and 11" are each free to slide along first interconnecting link 12 and second interconnecting link 12', respectively. In operation, placing tension on any of rings 11 or 11' tightens training collar 8 around the neck of an animal (not shown). In the embodiment chosen for purposes of disclosure, first, second, and third interconnection links 12, 12', 12" are each formed from chain, typically steel chain. It should be recognized that other materials having adequate strength to retain the size or weight animal wearing training collar 8 could be utilized. It will also recognized by those of skill in that art one or more of the rings 10, 11, 11', and 11" could have shapes other than circular as long as rings 10, and 11" were free to slide freely over their respective interconnecting linkages 12, 12'.

Figure 2:
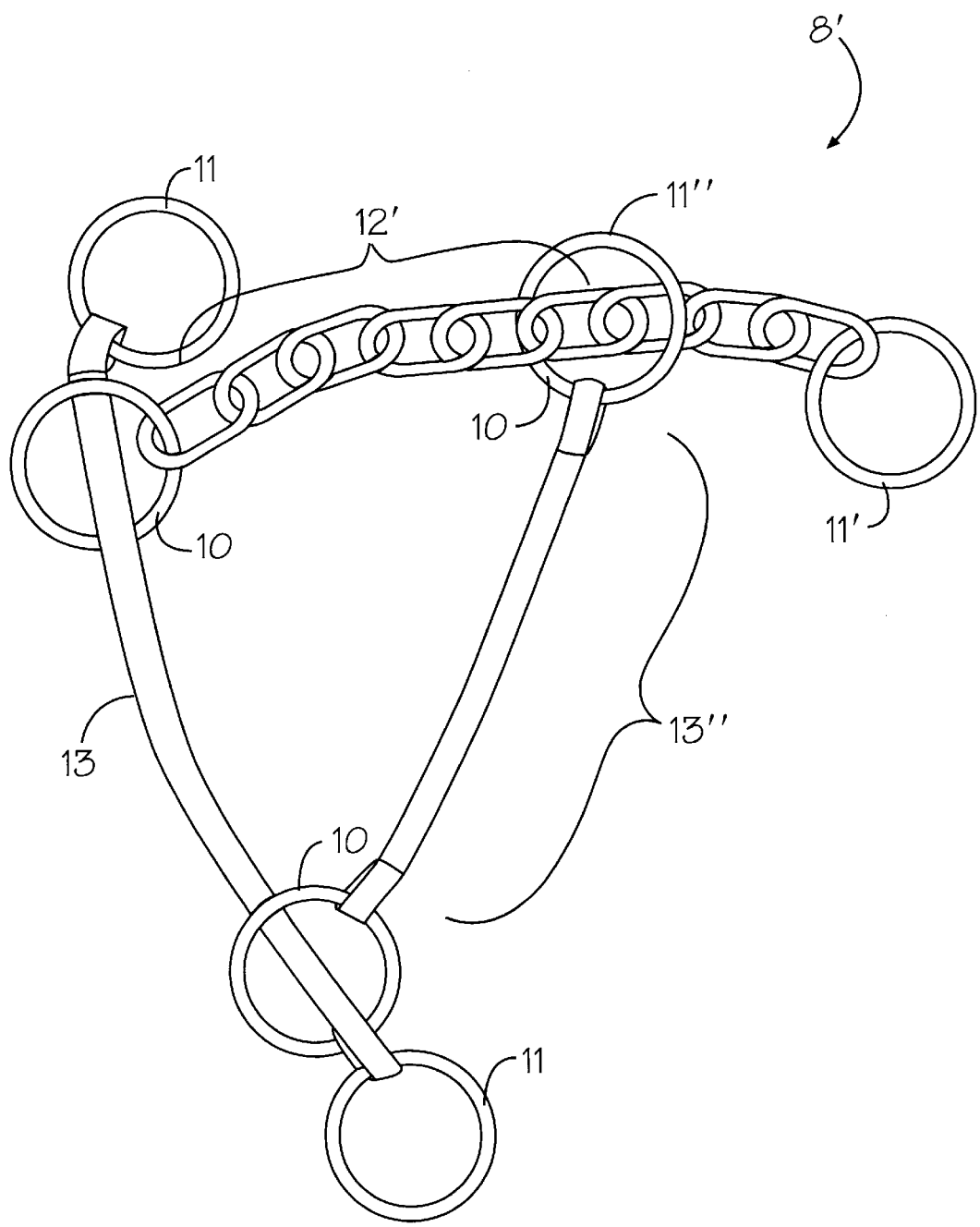
FIG. 2 is a perspective view of an alternate embodiment of the training collar of FIG. 1 having two segments formed from leather or nylon strapping.
Figure 4:
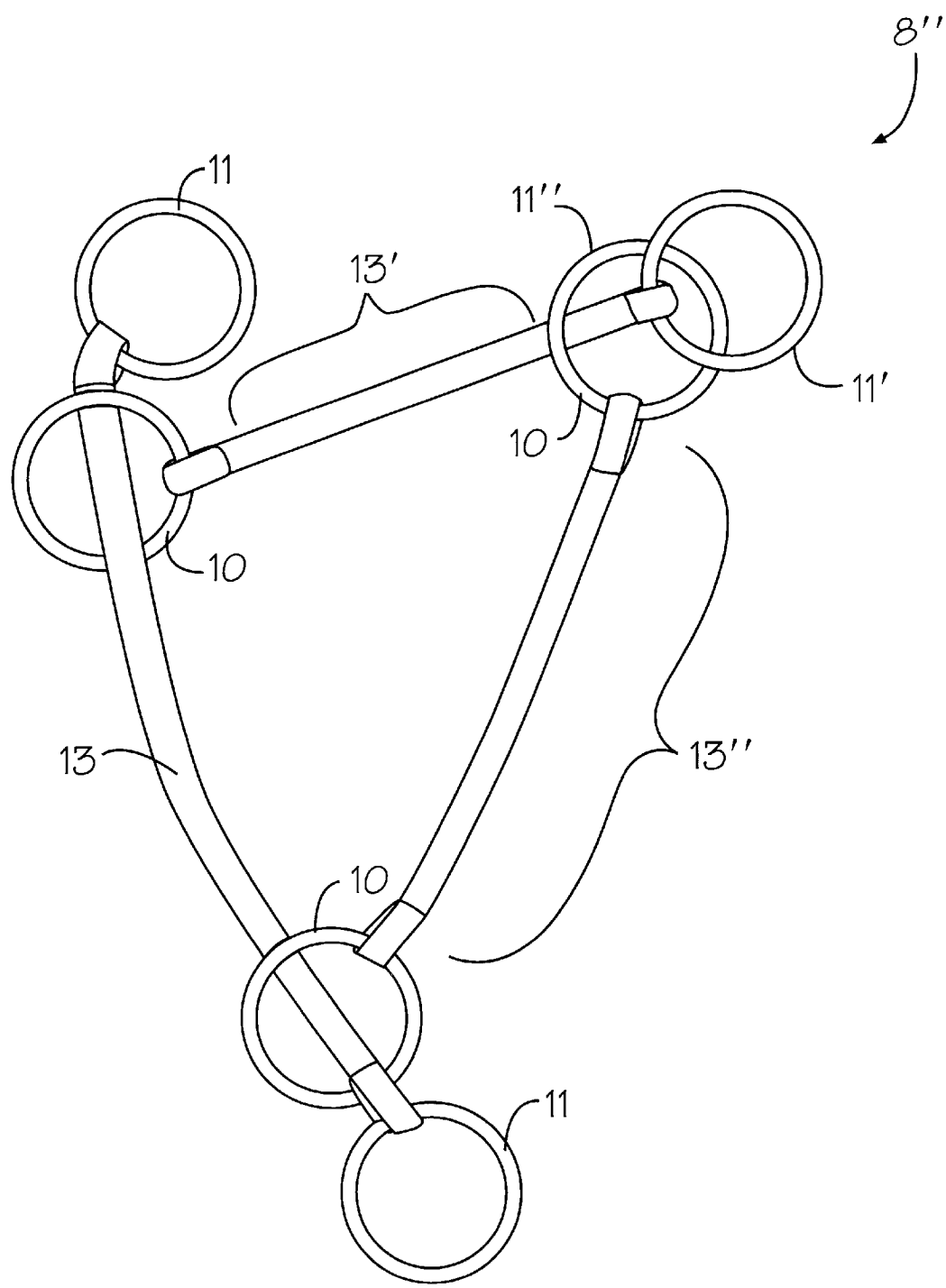
FIG. 4 is a perspective view of another alternate embodiment of the training collar of FIG. 1 wherein all chain segments have been replaced by leather or nylon strapping.

In alternate embodiments of the inventive training collar, one or more of interconnecting links 12, 12, 12" may be replaced by materials and/or forms other than steel chain. Referring now also to FIG. 2, there is shown an alternate embodiment of the inventive training collar 8' wherein first connecting link 12 and third connecting link 12" have been replaced by leather or nylon straps 13, 13". Referring now also to FIG. 4, all three interconnecting linkages 12, 12' and 12" of inventive training collar 8" have been replaced by leather or nylon straps 13, 13' and 13", respectively.

Figure 3:
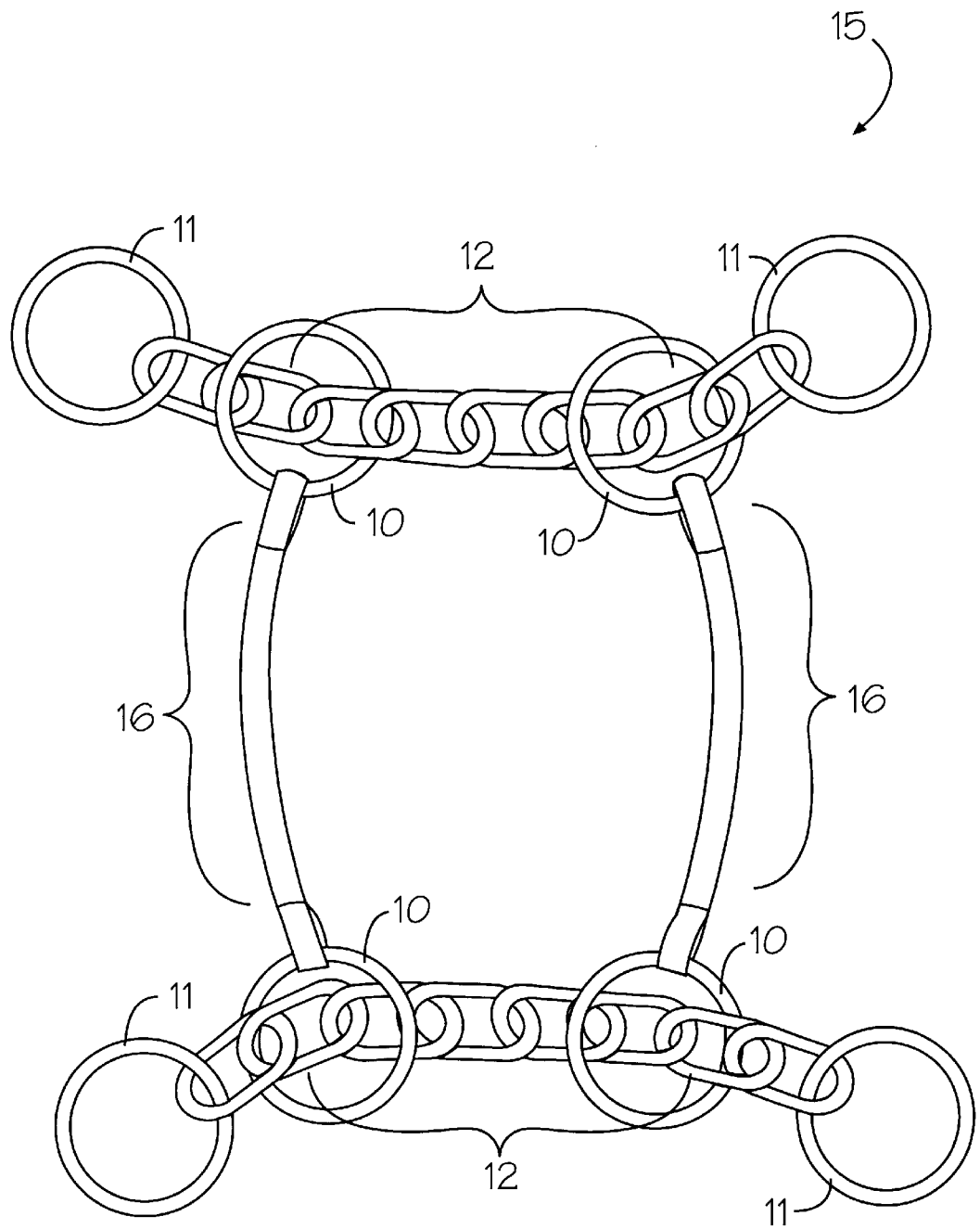
FIG. 3 is a perspective view of another alternate embodiment of the training collar showing four rings and segments of both chain and leather or nylon strapping.

Referring now to FIG. 3, there is shown a perspective view of another alternate embodiment of the dog training collar of the invention, generally at reference number 15. The embodiments of FIGS. 1, 2, and 4 are so-called three ring embodiments as three rings are provided. In addition, three rings are free to move along interconnecting links. Referring now also to FIG. 3, yet another alternate embodiment of the inventive training collar is shown, generally at reference number 15. Training collar 15 has four rings 11. In addition, collar 15 has four rings 10 each free to move along one of two interconnecting links 12. Each of two interconnecting links 16 has a substantially circular ring 10 slidably affixed at each end. As with the three-ring embodiments 8, 8' 8" of FIGS. 1, 2, and 4, any combination of interconnecting links 12 and 16 may be formed interchangeably from chain, leather straps, or nylon straps.

In operation, a leash or other similar restraint (not shown) is typically attached to one or more of rings 11, 11'. Tension on the leash tightens the collar 8, 8', 8", 15 around the neck of the animal (not shown). Because rings 11, 11' are distributed approximately equidistantly around the periphery of the collar 8, 8', 8", 15, typically one or more rings 11, 11' will be accessible at or near the top or side of the animal's neck (not shown). This facilitates use of the leash or restraint without a user needing to access the underside of the animal's neck, thereby overcoming the limitations of prior art collars.

Since other modifications and changes varied to fit particular operating conditions and environments or designs will be apparent to those skilled in the art, the invention is not considered limited to the examples chosen for purposes of disclosure, and covers changes and modifications that do not constitute departures from the true scope of this invention.

Having thus described the invention, what is desired to be protected by Letters Patent is presented in the subsequently appended claims.

What is claimed is:

1. An animal training collar comprising at least three interconnecting links each having a transverse width and each having two ends with a substantially circular ring slidably attached to each of said ends, each ring having a diameter substantially greater than the transverse width of a link, each of said at least three interconnecting links having at least one of said substantially circular rings slidably attached to at least one other of said at least three interconnecting links, said substantially circular rings each being adapted for providing an attachment point for a leash or similar restraint, said substantially circular rings being disposed around a perimeter of said training collar; at least two of said rings providing substantially only restraint of an animal wearing said training collar, at least two other of said rings providing both restraint and chocking, whereby at least one of said at least two restraint only rings and said at least two restraint and choking rings is accessible proximate the top of an animal's neck thereby facilitating attachment of a leash to one of said at least one ring.

2. The animal training collar as recited in claim 1, wherein at least one of said interconnecting links comprises a chain.

3. The animal training collar as recited in claim 2, wherein said chain comprises a steel chain.

4. The animal training collar as recited in claim 1, wherein at least one of said interconnecting links comprises a strap.

5. The animal training collar as recited in claim 4, wherein said strap comprises at least one of the materials: leather and nylon.

6. The animal training collar as recited in claim 1, wherein at least three interconnecting links comprises exactly three interconnecting links.

7. The animal training collar as recited in claim 1, wherein at least three interconnecting links comprises exactly four interconnecting links.

8. The animal training collar as recited in claim 7, wherein two of said interconnecting links comprises chain interconnecting links and two of said interconnecting links comprise strap interconnecting links.

* * * * *